Figure 2:
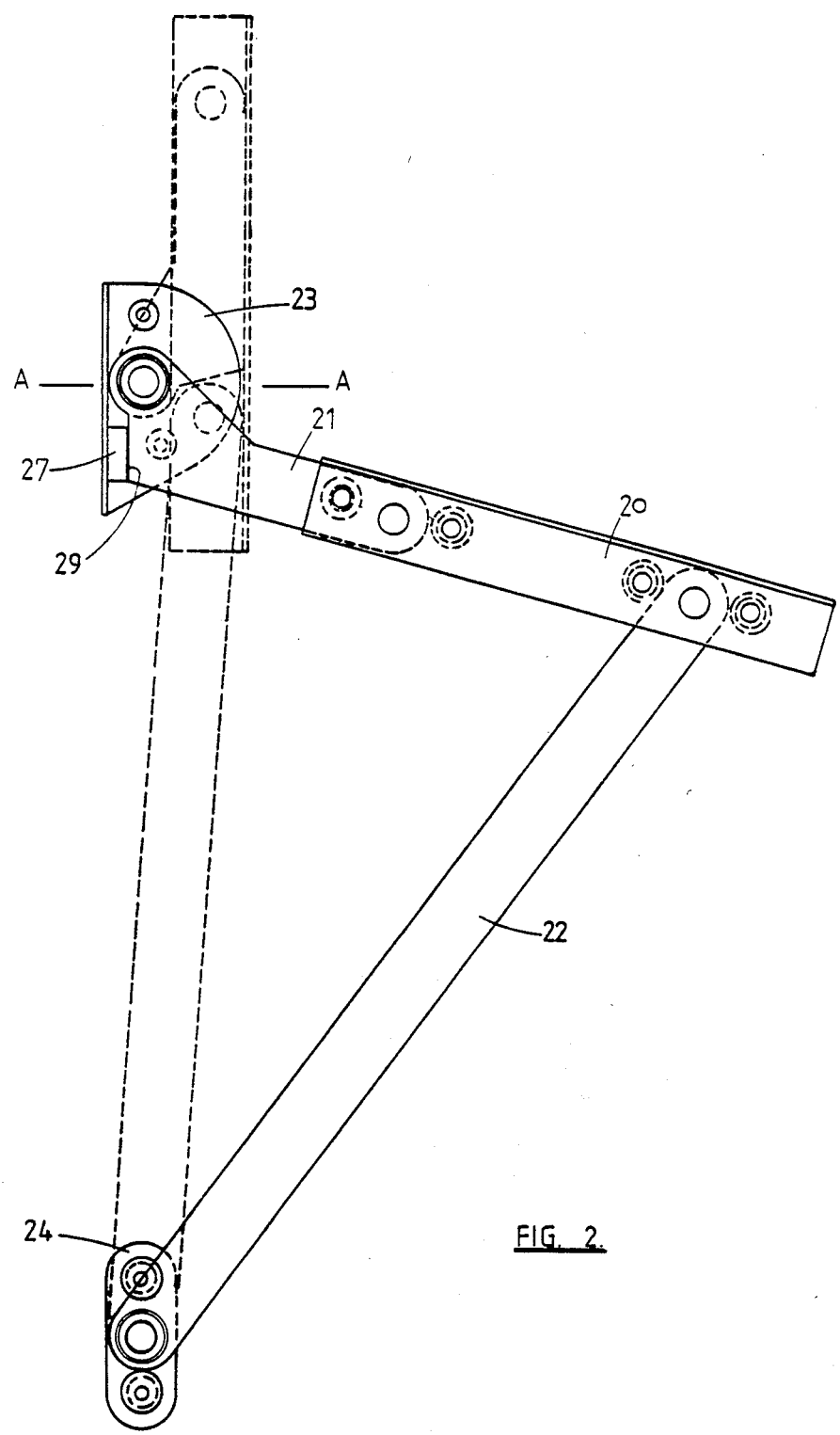

United States Patent [19]

Davis

[11] Patent Number: 4,582,435
[45] Date of Patent: Apr. 15, 1986

[54] PIVOT BEARING

[75] Inventor: Ronald P. Davis, Seatoun, New Zealand

[73] Assignee: Interlock Industries Limited, Wellington, New Zealand

[21] Appl. No.: 541,735

[22] Filed: Oct. 13, 1983

[30] Foreign Application Priority Data

Oct. 18, 1982 [NZ] New Zealand .................. 202214
Dec. 9, 1982 [NZ] New Zealand .................. 202755

[51] Int. Cl.$^4$ .................. F16C 17/12; F16C 35/07; F16B 19/00; F16B 43/00
[52] U.S. Cl. .................. 384/129; 384/439; 403/162; 403/163
[58] Field of Search .............. 308/2 R; 384/129, 275, 384/276, 296–300, 420–422, 428, 438–440; 403/163, 162, 145, 146, 227, 225, 408, 24

[56] References Cited

U.S. PATENT DOCUMENTS

| | | | |
|---|---|---|---|
| 2,546,801 | 3/1951 | Visone | 384/129 |
| 2,760,762 | 8/1956 | Woodman | 384/439 X |
| 2,921,819 | 1/1960 | Rifkin | 384/439 |
| 2,964,341 | 12/1960 | Doyle et al. | 384/299 X |
| 3,328,072 | 6/1967 | Adamski | 403/162 X |
| 3,561,792 | 2/1971 | Cycowicz | 403/162 X |
| 4,441,835 | 4/1984 | Davis | 403/162 X |

FOREIGN PATENT DOCUMENTS 95511 5/1963 Denmark .................. 384/275

Primary Examiner—John M. Jillions
Assistant Examiner—Thomas R. Hannon
Attorney, Agent, or Firm—Young & Thompson

[57] ABSTRACT

A pivot bearing between first and second components (10,11) each of which is formed from a metal material. The pivot bearing comprises a hollow annular boss (14) which is formed as an integral part of the first component (10) by being drawn from the base material from which the first component is formed. An opening (12) is provided in the second component (11) and the annular boss (14) is pivotally located within the opening. The free end portion (18) of the boss (14) is pressed over such that the cross-sectional area of the free end is greater than the opening (12) thereby pivotally retaining the second component (11) on the annular boss (14). A wear-resistant plastics bushing comprising a sleeve (15) and a flange (16) can be positioned within the bearing and placed under pressure by the coupling of the components to create a required level of friction within the bearing.

6 Claims, 8 Drawing Figures

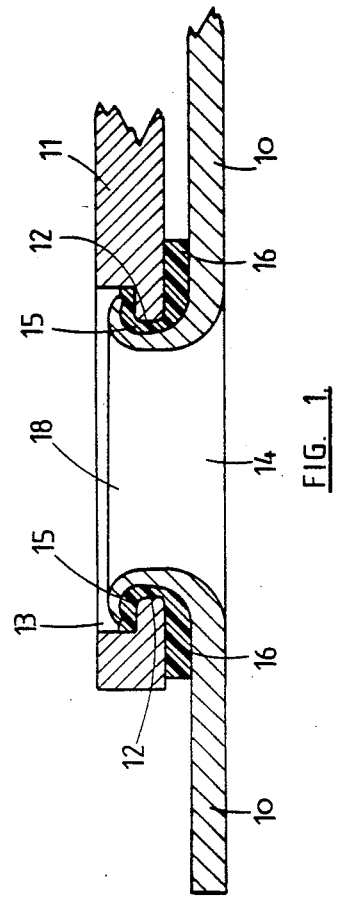
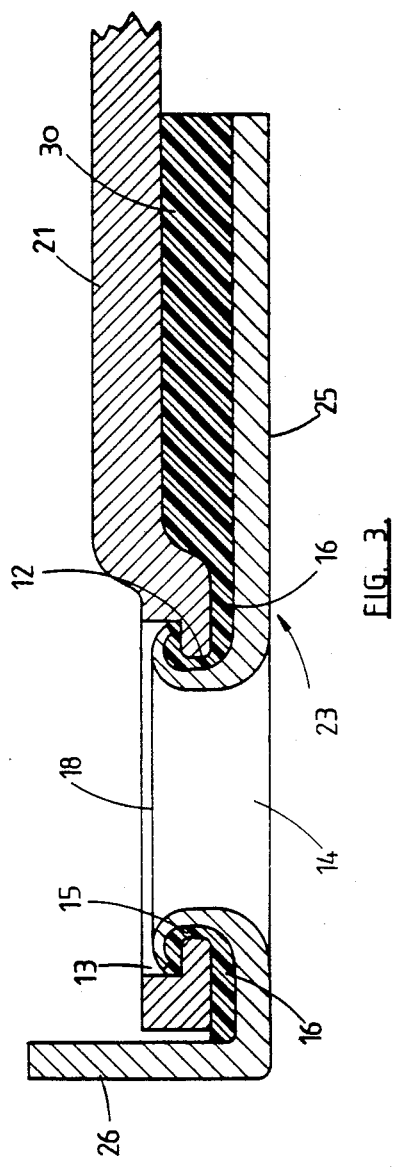

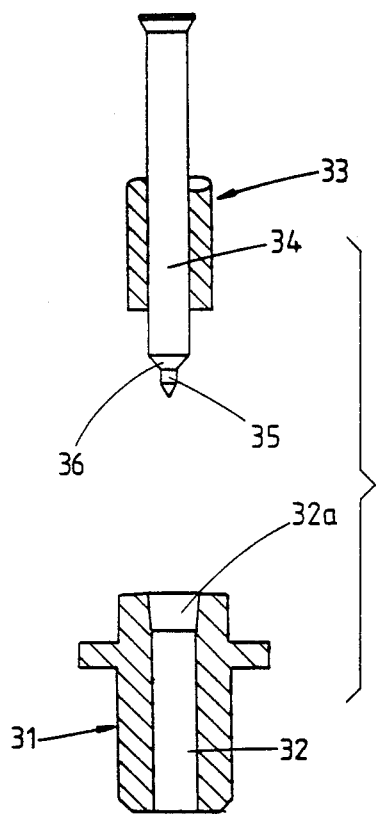
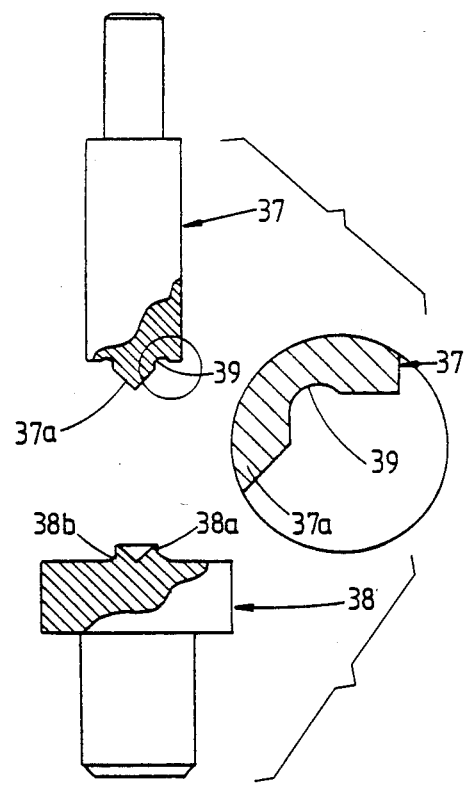
FIG. 7.
FIG. 8.

PIVOT BEARING

This invention relates to a pivot bearing and more particularly but not exclusively to a pivot bearing, preferably of a friction type, for use in a window stay.

Window stays for the adjustable mounting of a sash in a window frame include pivot bearings which are either of a friction or a non-friction type. A friction type pivot bearing is one where the friction in the bearing is a prime means of retaining the window in its open position. Such pivot bearings whether they be of a friction or non-friction type employ a separate rivet or the like fastening to retain the components being joined together. Normally the pivot bearing is between an arm and a base mounting plate with the arm being able to move relative to the mounting plate about the axis of the rivet.

Problems do arise from the necessity of having a rivet to couple the components together. For example the geometry of a window stay is very important especially if a degree of "pull-in" is to be achieved during closing of the window. Accordingly when a manufacturer produces a window stay it is important to ensure that the positions of the centres of pivot bearings are accurately determined and are thus positioned uniformly from one stay to another. Still further the presence of a rivet adds to the cost of the final construction not only in the terms of componentry but also in assembly costs.

The objects of the present invention is to provide a pivot bearing wherein an effective pivot bearing is provided without the need for a rivet or the like mechanical fastening.

According to the invention in its broadest aspect there is provided a pivot bearing between first and second components each of which is formed from a metal material, said pivot bearing comprising a hollow annular boss formed as an integral part of said first component by being drawn from the base material thereof, an opening in said second component, said annular boss being pivotally located within the opening and the free end portion of the boss being pressed over such that the cross-sectional area of the free end is greater than the opening thereby pivotally retaining the second component on said annular boss.

In a preferred form of the invention, to prevent metal-to-metal contact between the bearing components a self-lubrication wear-resistant plastics material is located within the bearing. In a preferred form the wear-resistant plastics material is in the form of a flanged sleeve the flange being located between the first and second components and the sleeve being located between the outer wall of the annular boss and the wall surface of the opening. The free end of the plastics material sleeve is also pressed over with the free or outer end of the boss so as to prevent metal-to-metal contact between the pressed over free or outer end and material surrounding the opening in the second component.

Figure 4:
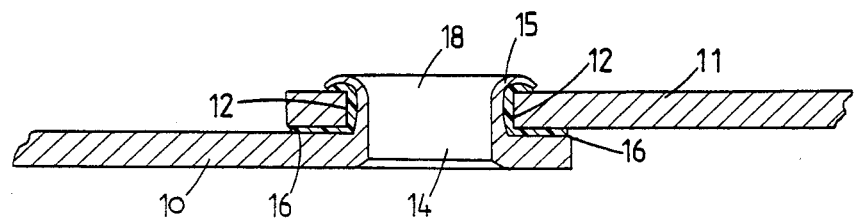
Figure 5:
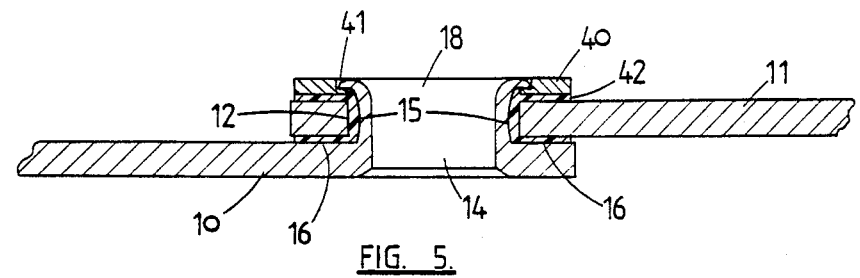
Figure 6A:
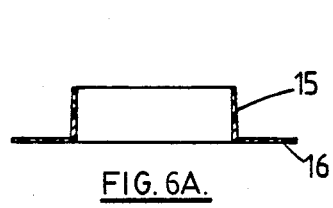
Figure 6B:
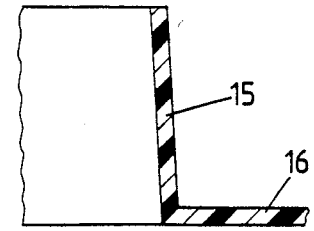

To more fully describe the invention reference will be made to the accompanying drawings in which:

FIG. 1 is a cross-sectional elevational view of one form of the pivot bearing joining two metal components together, FIG. 2 is an elevational view of a window stay incorporating a pivot bearing according to the invention, FIG. 3 is a cross-section on line A—A of FIG. 2, FIG. 4 is a cross-sectional elevational view of a modified form of the pivot bearing, FIG. 5 is a cross-sectional elevational view of a second form of the pivot bearing, FIG. 6 is a cross-sectional view of the wear resistant plastics element used in the bearing of FIGS. 1, 3 and 4, FIG. 7 is a cross-sectional view of a punch and die set used to form the boss from the parent metal, and FIG. 8 is a cross-sectional view of a punch and anvil set for pressing over the end of the boss.

As previously stated the pivot bearing is particularly suitable for a window stay and for the ease of reference the following disclosure will refer to the window stay application of the bearing.

In the drawing the first component is indicated at 10 and in a window stay application would form the base or mounting plate of the stay. This mounting plate could be for mounting to either the window frame or window sash. The second component is shown at 11 and in the window stay application would comprise an arm extending between sash and frame mounting plates.

Second component 11 is formed with an opening 12 and preferably this opening 12 is counterbored so as to form a recess 13. In preferred forms of the invention when the pivot bearing is used in a window stay application the first and second components are formed from stainless steel or an aluminium alloy.

The hollow annular boss 14 is formed as an integral part of the first component 10 by being drawn from the base or parent material. In a preferred form of the invention the boss 14 is drawn by firstly establishing a small hole in the first component 10 this hole accurately determining the centre of the resultant pivot bearing. One or a number of drawing operations are then carried out so that the boss 14 is formed from drawing metal from around the opening formed in the first component 10.

Preferably, in order to prevent metal-to-metal contact within the bearing a wear-resistant plastics material is incorporated. This plastic material is preferably a nylon material and is in the form of a flanged sleeve 15. The sleeve 15 is located over the boss 14 so that the flange 16 lies against the surface of the first component 10. The second component 11 is then placed over the boss 14 and sleeve 15 following which the free or outer end 18 of the boss 14 is swaged or pressed over so as to form a cross-sectional area which is greater than the diameter of the opening. This swaging or pressing over also presses over the free end of the sleeve 14 thereby resulting in a bearing where metal-to-metal contact between the second component and the boss and facing surface of the first component is prevented by the sandwiched wear-resistant sleeve 15 and flange 16. The recess 13 ensures that the swaged or pressed over end 18 is located within the recess thereby keeping the front to back dimension, i.e. thickness, of the pivot joint to a minimum and also contains the nylon which cold flows under the pressure of the coupling achieved by the deformed boss 14.

A pivot bearing is thus provided where a rivet or like mechanical fastening is not required. The pivot bearing is robust and with the pressure applied to the contained plastics material a friction bearing suitable for the adjustable opening of a window where the friction in the bearing serves to hold the window open. The pivot bearing also has the advantage that in situations where a high loading is to be applied to the window stay say due to the need to carry large dimensioned sashes or heavy double glazed sashes fastening of the mounting plate to the window frame can take place by the mechanical fastening actually passing through the centre of the hollow annular boss 14. Such a method of mounting helps resist any bending moment applied to the pivot bearing by the weight of the sash on the arm this being a problem with stays when used in a side hung casement application.

Where high friction in a particular bearing is required and/or where a levering force is applied to the bearing when the window is open the bearing can take the form shown in FIG. 5 where a washer 40 is located at the free end of the boss 14. The washer 40 is recessed at 41 with the rolled over end of the boss located therein. A washer 42 of wear resistant plastics material is located between washer 40 and the surface of component 11 such that there is no metal-to-metal contact. The higher friction level is achieved by the presence of the additional surfaces of washer 42 sandwiched between the washer 40 and surface of component 11. In addition any leverage forces applied to the deformed or rolled over end boss 14 do not lead to wear of the deformed end due to it bearing directly on the washer 40.

The pivot bearing of this invention provides a particularly strong link between the baseplate and the arm as the hollow annular boss is an integral part of the baseplate rather than a separate component as is the case with a conventional rivet coupling. With known window friction bearings it is preferable to lock the tail of the rivet so that it does not rotate. This, however, leads to problems of how to lock the tail. With the present bearing the absence of a rivet obviates these problems. An added factor leading to increased strength in the bearing is that the diameter of the boss is larger than that of a rivet in a conventional riveted bearing thus the loads applied to the bearing are distributed over a wider area of the baseplate and arm.

A problem with window stay construction where the bearing is near the end of an arm is that the final pressing operation applies an outward pressure which can lead to distortion of the arm. With the present bearing, however, the final pressing is in a downward direction and this coupled with the plastics material between the sleeve and the end of the arm lessens distortion of the arm.

In a friction bearing application the pressure which is applied to the deformable end of the annular sleeve is a pressure which is applied at a greater diameter than with friction bearings employing rivets. This enables a higher level of friction to be achieved and in practical terms allows the manufacture of smaller cheaper stays for the support of a given window size.

FIGS. 2 and 3 of the drawings illustrate a design of window stay which can usefully employ the pivot bearing according to the invention. The window stay consists of a sash mounting plate 20 and a pair of arms 21 and 22. Arms 21 and 22 are pivotally coupled to the sash plate 20 employing pivot bearings of the present invention. The other ends of arms 21 and 22 are pivoted to base mounting plates 23 and 24 once again employing the pivot bearing according to the invention. In the preferred form of the window stay the mounting plates and arms are manufactured from stainless steel.

The mounting plates 23 is of a generally D shape and has a base portion 25 with an upstanding portion 26. Adjacent the upstanding portion 26 is a projection 27 which in the fully open position of the stay forms a stop which engages with the straight surface 29 of arm 21. In this preferred design the wear-resistant material forming part of the bearing between arm 21 and frame plate 23 covers substantially all the surface of the mounting plate and is of increased cross-sectional thickness 30 between the base portion 25 and arm 21. For the reasons stated the bearing used to couple arm 21 to mounting plate 23 can be of the form shown in FIG. 5.

In a modified form of the invention the sash plate 20 can be formed in two separate parts so that the stay then consists of two entirely separate arms with their respective mounting plates.

It is not essential to form a counterbored recess for the deformed end of the boss—see FIGS. 4 and 5. In friction bearings where the nylon material is placed under pressure the end of the nylon sleeve is captured under the turned-over end portion 18 of the boss 14.

Whilst the foregoing disclosure indicates that the annular boss is formed from the baseplate this is by no means essential with the result that the annular boss can be formed from the base metal of the arm and be located through an opening in the mounting plate. This latter arrangement is particularly suitable when the arm(s) and mounting plates of the stay are formed from aluminium or aluminium alloy, as the usually greater thickness of the arm provides a thick body of metal from which the boss can be formed.

In the preferred method of constructing boss 14 a punch and die set substantially of the type illustrated in FIG. 7 is employed. The die 31 has a circular cross-section polished hole 32 with an inwardly tapering lead in 32a. Punch 33 includes a body portion 34 with a cylindrical leading end portion 35 connected thereto by angled shoulder portion 36. Preferably shoulder 36 is at an angle to the axis of body 34 which is substantially in the range of 35°-55° but more preferably 45°. The diameter of body 34 is greater than the largest diameter of hole 32 by a dimension which is substantially twice the wall thickness of the boss to be formed.

The leading end 35 is of substantially constant diameter throughout its length and this diameter is appreciably smaller than that of the body 34. Shoulder portion 36 by being angled as shown ensures the metal extruded during passage of punch 33 flows up around body 34 thereof. The corners of the shoulder portion 36 are slightly radiused so as to prevent shearing of the metal during formation of the boss.

The leading edge of hole 32 is also radiused so as to prevent shearing of the metal. The depth of hole 32 is substantially greater than the length of the boss to be formed. To ensure that the end of the boss when formed is compact and of uniform length an annular shoulder (not shown) can be incorporated within hole 32.

In operation the body of metal (say the arm of a window stay) in which the boss is to be formed is located between the punch 33 and die 31. The punch is then brought into contact with the metal and pressure applied thereto. Leading end 35 penetrates the metal and when break through occurs at the die side of the metal a slug of metal is ejected.

The following angled shoulder 36 pushes the metal surrounding the opening formed by leading end 35 in a sideways and downward manner thereby moving the metal downwardly in hole 32. The final wall thickness of the boss is achieved by the passage into hole 32 of the body 34. The angle shoulder portion 36, in one embodiment of the method, cannot pass right through the formed boss with the result that a shoulder of greater thickness than the wall thickness of the boss is formed at the free end of the boss. This increased thickness at the free end permits the free end to be rolled over without appreciable splitting taking place. Even when rolled over the end of the boss has the maximum available thickness which provides strength to the bearing when in tension.

The tapered nature of the bore 32a results in the boss being formed with a tapered outer wall and uniform diameter body 34 results in the boss having a constant diameter bore. Accordingly, the wear resistant plastics bush, which is more particularly shown in FIG. 6, is tapered in the length of sleeve 15 as shown.

The free end portion of the boss 14 is deformed by punch and anvil set of the type shown in FIG. 8. The punch 37 has a projecting portion 37a which locates in the bore at the free end of boss 14 whilst anvil 38 has a projecting portion 38a which engages in the lower end of the bore. A curved portion 39 at the base of projecting portion 37a rolls over the free end of the boss as the punch and anvil come together, however, this rolling over action coupled with the tapered wall section of the undeformed boss results in the upper wall portion of the boss being pushed radially outwardly to sandwich the sleeve 15 between it and the wall of opening 12. A slightly radiused portion 38b at the base of projecting portion 38a applies a curved profile to the bore wall at the base of boss 14. During deformation of the boss therefore both axial and radial pressure is applied to the contained plastics material thereby setting up the required friction level in the bearing.

The wear resistant plastics material does not always need to be present in a pivot bearing formed from stainless steel.

I claim:

1. In a window stay for the adjusted mounting of a sash in a window frame, said stay having at least first and second metal components pivotally coupled together by a pivot bearing, said pivot bearing comprising a hollow annular boss formed as an integral part of the said first component by being drawn from the base material thereof such that the hollow annular boss has a cross-sectional wall thickness which is less than the thickness of the base material from which it is drawn, said annular boss having a free end disposed a distance from the surface of the first component from which the boss extends and further having inner and outer wall surfaces, said outer wall surface at least in part forming a bearing surface, an opening extending through said second component and being defined at least in part by a peripheral wall surface, said annular boss being located within said opening such that the bearing surface thereof is engaged with the peripheral wall surface of the opening whereby the annular boss is rotatable within said opening, the free end portion of the boss being pressed over such that the cross-sectional area of the free end is greater than the opening thereby retaining the second component on said annular boss, and a wear resistant plastics bushing comprising a sleeve having a flange positioned within said bearing, the sleve being located between the bearing surface of the outer wall of the annular boss and the peripheral wall surface of the opening and the flange between the first and second components, said bushing being under sufficient pressure by the coupling of the components to create a required level of friction within the bearing.

2. The window stay of claim 1 wherein the pressed over end of the annular boss is located within a recess in the second component.

3. The window stay of claim 1 wherein the pressed over end of the annular boss engages with a washer located on the boss prior to the free end being pressed over, said washer being separated from contact with said second component by a wear resistant plastics material.

4. The window stay of claim 3, wherein the pressed over end of the annular boss is located within a recess in the said washer.

5. The window stay of claim 1, wherein the bore of the annular boss is of substantially uniform diameter and the outer wall surface of the annular boss tapers toward the free end of the boss, the portion of the outer wall surface adjacent to that portion which is pressed over being pressed outwardly during pressing over such that the wear resistant plastics bushing is under both radial and axial pressure within the bearing.

6. The window stay of claim 1, in which said first and second metal components are elongated metal members pivotally coupled together by said pivot bearing at one end of each member.

* * * * *